United States Patent [19]

Ngoc

[11] Patent Number: 6,166,160
[45] Date of Patent: Dec. 26, 2000

[54] PROCESS FOR MAKING DEODORIZED RUBBERY POLYMER

[75] Inventor: Hung Dang Ngoc, Limeil Brevannes, France

[73] Assignee: The Goodyear Tire & Rubber Company, Akron, Ohio

[21] Appl. No.: 09/244,593

[22] Filed: Feb. 4, 1999

[51] Int. Cl.$^7$ .................................................. C08F 220/12
[52] U.S. Cl. ..................... 526/329.3; 526/173; 526/181; 526/184; 526/219.2; 526/328.5; 526/329.2; 526/341; 526/346
[58] Field of Search .................................. 526/173, 181, 526/184, 219.2, 328.5, 329.2, 329.3, 341, 346

[56] References Cited

U.S. PATENT DOCUMENTS

| | | | |
|---|---|---|---|
| 5,415,940 | 5/1995 | Dang Ngoc et al. | 428/424.4 |
| 5,616,651 | 4/1997 | Nino et al. | 525/305 |
| 5,674,933 | 10/1997 | Dang Ngoc et al. | 524/504 |

FOREIGN PATENT DOCUMENTS 0475258   9/1991   European Pat. Off. .

*Primary Examiner*—Helen L. Pezzuto
*Attorney, Agent, or Firm*—Alvin T Rockhill

[57] ABSTRACT

There is a need for odorless rubbery polymers that offer high heat resistance, ultraviolet light resistance and low fogging characteristics. For instance, rubbery polymers of this type are needed by the automotive and construction industries. The deodorized rubbery polymers of this invention are of particular value because they can be blended with polyvinyl chloride to make leathery compositions having good heat and ultraviolet light resistance. The present invention more specifically discloses a process for preparing a deodorized rubbery polymer which comprises the steps of (1) polymerizing in a first stage (a) butyl acrylate, (b) at least one member selected from the group consisting of methyl methacrylate, ethyl methacrylate, methyl acrylate and ethyl acrylate, (c) acrylonitrile and (d) a crosslinking agent under emulsion polymerization conditions to produce a seed polymer containing latex, wherein said polymerization is initiated with a redox initiator system, wherein the redox initiator system is comprised of a free radical generator and a reducing agent; (2) adding (a) styrene, (b) additional acrylonitrile, (c) additional crosslinking agent and (d) additional free radical generator to the seed polymer containing latex under emulsion polymerization conditions which result in the formation of an emulsion containing the rubbery polymer; and (3) recovering the rubbery polymer from the emulsion containing the rubbery polymer.

10 Claims, No Drawings

PROCESS FOR MAKING DEODORIZED RUBBERY POLYMER

BACKGROUND OF THE INVENTION

Automotive instrument panels and door panels are typically composites which are made of a rigid backing which supports a semi-rigid urethane foam with the semi-rigid urethane foam being covered with a skin compound. Such skin compounds are typically blends of polyvinyl chloride (PVC) with a nitrile rubber (NBR). The nitrile rubber is included in such blends as a permanent modifier for the PVC which provides it with a higher degree of flexibility. The automotive industry is currently moving toward more aerodynamic body designs which typically include larger glass areas. Such design changes have significantly increased the heat and ultraviolet light aging requirements of automotive interiors. This has in turn significantly increased the demands put upon the polymers which are utilized as skins in automotive interior panels.

Heat and light stabilizers can be employed to improve the heat and ultraviolet light aging characteristics of conventional PVC/NBR blends which are utilized as skins for automotive interior panels. However, the degree to which the aging characteristics of such blends can be improved by the addition of additives is limited. In fact, there is a demand for performance characteristics in such applications which heretofore has not been realized by the utilization of heat and light stabilizers.

It is highly desirable for the skins used in automotive panels to resist discoloration and cracking under conditions of high heat and intense ultraviolet light throughout the life of the vehicle. Low fogging behavior is also of great importance to the automotive industry. Fogging is caused by the condensation of volatile compounds which vaporize from the interior panel onto the windscreen or side windows of the vehicle.

NBR/PVC blends offer an array of properties which make them useful as a skin composition for automotive panels. The NBR acts as a permanent flexibilizing monomer for the PVC. It also acts as a shrinkage control agent, and embossing aid, and improves grain retention. The NBR in such blends further provides vacuum-forming gauge control and exhibits low fog characteristics. NBR is highly compatible with PVC and has the capability of being recycled. It is essential for any polymer which is substituted for NBR to display these essential characteristics.

Rubbery polymers that can be blended with PVC to make leathery compositions having good heat and ultraviolet light resistance are described in U.S. Pat. Nos. 5,674,933, 5,616,651 and 5,415,940. These rubbery polymers are comprised of repeat units which are derived from (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a half ester maleate soap or a dispersant selected from the group consisting of aromatic formaldehyde condensation products and polycarboxylates and (f) a crosslinking agent. Rubbery polymers of this type are sold by The Goodyear Tire & Rubber Company as Sunigum® rubber. However, rubbery polymers of this type often possess an undesirable odor caused by the presence of residual monomers.

Numerous technique can be used to reduce the level of residual monomers in such rubbery polymers. For instance, U.S. Pat. No. 5,674,933 describes a technique for deodorizing such rubbery polymers by adding an aminoalcohol to the latex prior to coagulation. One drawback to this approach is that it introduces the aminoalcohol into the rubbery polymer and adds cost.

SUMMARY OF THE INVENTION

By utilizing the technique of this invention, a deodorized rubbery polymer is made at low cost without introducing any foreign materials into the product. The deodorized rubber made by this technique also offers a high level of heat and ultraviolet light resistance, low fog characteristics, shrinkage control and grain retention. This invention is based upon the unexpected understanding that the level of residual monomers in the rubbery polymer can be substantially reduced by initiating the polymerization with certain redox initiator systems.

This invention more specifically discloses a process for preparing a deodorized rubbery polymer which comprises the steps of (1) polymerizing in a first stage (a) butyl acrylate, (b) at least one member selected from the group consisting of methyl methacrylate, ethyl methacrylate, methyl acrylate and ethyl acrylate, (c) acrylonitrile and (d) a crosslinking agent under emulsion polymerization conditions to produce a seed polymer containing latex, wherein said polymerization is initiated with a redox initiator system, wherein the redox initiator system is comprised of a free radical generator and a reducing agent; (2) adding (a) styrene, (b) additional acrylonitrile, (c) additional crosslinking agent and (d) additional free radical generator to the seed polymer containing latex under emulsion polymerization conditions which result in the formation of an emulsion containing the rubbery polymer; and (3) recovering the rubbery polymer from the emulsion containing the rubbery polymer.

DETAILED DESCRIPTION OF THE INVENTION

The rubbery polymers made by the process of this invention are synthesized utilizing a free radical emulsion polymerization technique. These rubbery polymers are comprised of repeat units which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene, (e) a half ester maleate soap or a dispersant selected from the group consisting of aromatic formaldehyde condensation products and polycarboxylates and (f) a crosslinking agent. The crosslinking agent is typically a multi-functional acrylate, a multi-functional methacrylate or divinylbenzene. Some specific examples of crosslinking agents which can be used include ethylene glycol methacrylate, divinylbenzene and 1,4-butanediol dimethacrylate.

Typically, the rubbery polymers of this invention contain repeat units (chain linkages) which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene, (e) a half ester maleate soap or a dispersant selected from the group consisting of aromatic formaldehyde condensation products and polycarboxylates and (f) a crosslinking agent. These repeat units differ from the monomers that they were derived from in that they contain one less carbon-carbon double bond than is present in the respective monomer. In other words, a carbon-to-carbon double bond is consumed during the polymerization of the monomer into a repeat unit in the rubbery polymer. Thus, in saying that the rubbery polymer contains various monomers, in actuality means that it contains repeat units that are derived from those monomers.

The process of this invention utilizes a free radical polymerization technique that is carried out in an aqueous reaction mixture. The reaction mixture utilized in this polymerization technique is comprised of water, the appropriate monomers, a suitable redox initiator system, a crosslinking agent, a half ester maleate soap or a dispersant selected from the group consisting of aromatic formaldehyde condensation products and polycarboxylates, and a metal salt of an alkyl sulfonate or a metal salt of an alkyl sulfate. The reaction mixture utilized in this polymerization technique will normally contain from about 10 weight percent to about 80 weight percent monomers, based upon the total weight of the reaction mixture. The reaction mixture will preferably contain from about 20 weight percent to about 70 weight percent monomers and will more preferably contain from about 40 weight percent to about 50 weight percent monomers.

The reaction mixtures utilized in carrying out the polymerizations of this invention will typically contain from about 0.1 phm (parts per hundred parts of monomer by weight) to about 5 phm of at least one member selected from the group consisting of metal salts of alkyl sulfates and metal salts of alkyl sulfonates and from 0.1 phm to about 5 phm of at least one dispersant selected from the group consisting of aromatic formaldehyde condensation products and polycarboxylates. It is generally preferred for the reaction mixture to contain from about 0.25 phm to about 4.25 phm of the metal salt of the alkyl sulfonate or the metal salt of the alkyl sulfate and from about 0.25 phm to about 4.25 phm of the dispersant selected from the group consisting of aromatic formaldehyde condensation products and polycarboxylates. It is normally more preferred for the reaction mixture to contain from about 0.4 phm to about 3.5 phm of the metal salt of the alkyl sulfonate or the metal salt of the alkyl sulfate and from about 0.4 phm to about 3.5 phm of the dispersant selected from the group consisting of aromatic formaldehyde condensation products and polycarboxylates.

In cases where a half ester maleate soap is utilized as a component of the emulsifier system, the reaction mixture will also contain from about 0.005 phm to about 1 phm of at least one member selected from the group consisting of meta salts of alkyl sulfates and metal salts of alkyl sulfonates. In such half ester maleate soap containing emulsifier systems, it is generally preferred for the reaction mixture to contain from about 0.008 phm to about 0.5 phm of the metal salt of the alkyl sulfonate or the metal salt of the alkyl sulfate. It is normally more preferred for the reaction mixture of such systems to contain from about 0.05 phm to about 0.3 phm of the metal salt of the alkyl sulfonate or the metal salt of the alkyl sulfate.

It is critical for the polymerization used in synthesizing the rubbery polymer to be initiated with a redox initiator system to reduce the level of residual monomers in the polymer. Such redox initiator systems are comprised of a free radical generator and a reducing agent. Numerous redox systems can be employed to initiate the polymerizations of this invention. These systems are comprised of (a) at least one oxidizing agent and (b) at least one reducing agent. However, in certain cases, a metal ion capable of existing in more than one valency state can be used in the redox system; in other cases, it is added to an existing redox couple as a promotor. The oxidizing agent will typically be a free radical generator, such as a peroxygen compound or azobis compound or a combination of both peroxygen compounds and azobis compounds. The reducing agent can be a polyalkylenepolyamine or sulfite or a related compound, such as sodium bisulfite, sodium metabisulfite, sodium dithionate, sodium formaldehyde sulfoxylate or ascorbic acid.

The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2,2' azobis(isobutyronitrile), 2,2' azobis (methylbutyronitrile), 2,2' azobis(2,4-dimethylvaleronitrile) 1,1' azobis(cyanocyclohexane), 4,4'-azobis(4-cyanovaleric acid), 2,2' azobis(2-amidinopropane)dihydrochloride, and the like. Water-soluble peroxygen- or azo-free radical initiators are especially useful in such aqueous polymerizations.

The sulfonates and sulfate derivatives that are useful in this invention are commercially available from a wide variety of sources. For instance, DuPont sells sodium alkylarylsulfonate under the tradename Alkanol™, Browning Chemical Corporation sells sodium dodecylbenzene sulfonates under the tradename Ufaryl™ Dl-85 and Ruetgers-Nease Chemical Company sells sodium cumene sulfonate under the tradename Naxonate Hydrotrope™. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

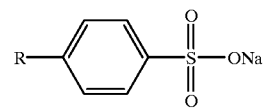

wherein R represents an alkyl group containing from 1 to about 20 carbon atoms. It is preferred for the alkyl group to contain from about 8 to about 14 carbon atoms.

Some specific examples of aromatic formaldehyde condensation products that can be used are provided in Columns 7–10 of U.S. Pat. No. 5,674,933. The teachings of United States Patent are incorporated by reference herein in their entirety.

The carboxylate is also a water-soluble polymeric dispersing agent. For instance, methacrylic acid can be polymerized to yield water-soluble homopolymer which can be employed as a carboxylate dispersant. Copolymers with maleic acid and acrylic acid-maleic acid (DIBMA) are also very useful in the practice of this invention. Carboxylate dispersants are commercially available from a variety of sources.

The free radical emulsion polymerizations utilized in synthesizing the rubbery polymers of this invention are typically conducted at a temperature which is within the range of about 10° C. to about 95° C. In most cases, the polymerization temperature utilized will vary between about 20° C. and about 80° C. At temperatures above about 88° C., alkyl acrylate monomers (such as butyl acrylate) have a tendency to boil. Thus, a pressurized jacket would be required for heating such alkyl acrylate monomers to temperatures in excess of about 88° C.

The polymerization is carried out as a two-step batch process. In the first step, a seed polymer containing latex is synthesized. This is done by polymerizing (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile and (d) a crosslinking agent.

The seed polymer containing latex is typically prepared by the polymerization of a monomer mixture which contains about 40 to about 90 weight percent butyl acrylate, or optionally a mixture of butyl acrylate and 2-ethylhexyl acrylate containing up to about 40 percent 2-ethylhexyl acrylate, from about 5 to about 35 weight percent methyl methacrylate, ethyl methacrylate, methyl acrylate or ethyl acrylate, from about 2 to about 30 weight percent acrylonitrile and from about 0.25 weight percent to 6 weight percent of the crosslinking agent. It is typically preferred for the monomeric component utilized in the first step to include about 50 weight percent to about 85 weight percent butyl acrylate, or optionally a mixture of butyl acrylate and 2-ethylhexyl acrylate containing up to about 40 percent 2-ethylhexyl acrylate, from about 5 weight percent to about 30 weight percent ethyl acrylate, ethyl methacrylate, methyl acrylate or methyl methacrylate, from about 4 weight percent to about 28 weight percent acrylonitrile and from about 0.5 weight percent to about 4 weight percent of the crosslinking agent. It is generally more preferred for the monomer charge composition used in synthesizing the seed polymer latex to contain from about 60 weight percent to about 80 weight percent butyl acrylate, or optionally a mixture of butyl acrylate and 2-ethylhexyl acrylate containing up to about 40 percent 2-ethylhexyl acrylate, from about 5 weight percent to about 25 weight percent methyl methacrylate, ethyl methacrylate, methyl acrylate or ethyl acrylate, from about 5 weight percent to about 25 weight percent acrylonitrile and from about 1 to about 3 weight percent crosslinking agent.

After the seed polymer latex has been prepared, styrene monomer, additional acrylonitrile monomer and additional crosslinking agent is added to the seed polymer containing latex. It is also critical to add additional free radical initiator to the second stage of the polymerization. As a general rule, from about 4 parts by weight to about 30 parts by weight of styrene, from about 1 part by weight to about 20 parts by weight of additional acrylonitrile and from about 0.01 to 2 parts by weight of the crosslinking agent will be added. In this second stage of the polymerization, it is preferred to add from about 6 parts by weight to about 22 parts by weight of parts by weight to 1 part by weight of the crosslinking agent. It is typically more preferred for from about 10 parts by weight to about 17 parts by weight of styrene, from about 4 parts by weight to about 8 parts by weight of acrylonitrile and from about 0.1 parts by weight to about 0.5 parts by weight of the crosslinking agent to be added to the seed polymer latex to initiate the second phase of the polymerization.

A wide variety of crosslinking agents can be utilized in carrying out the polymerizations of this invention. Some representative examples of crosslinking agents that can be utilized include difunctional acrylates, difunctional methacrylates, trifunctional acrylates, trifunctional methacrylates, and divinylbenzene. A crosslinking agent that has proven to be particularly useful is 1,4-butanediol dimethacrylate.

The half ester maleate soap that can be utilized in the polymerization is prepared by reacting maleic anhydride with a fatty alcohol containing from about 10 to about 24 carbon atoms. It is typically preferred to utilize a fatty alcohol which contains from about 12 to about 16 carbon atoms. One mole of the maleic anhydride is reacted with one mole of the fatty alcohol in producing the half ester maleate soap. This reaction is typically conducted at a temperature which is within the range of about 50° C. to about 80° C. and can be depicted as follows:

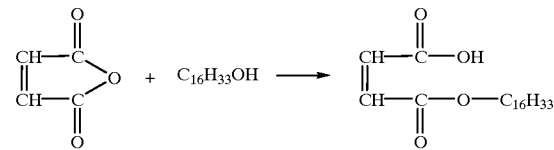

Sodium hydroxide or potassium hydroxide is then typically added to make the half ester maleate soap. This step can be depicted as follows:

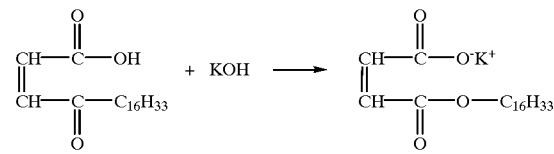

The polymerization will be continued until a high monomer conversion has been attained. At this point, the rubbery polymer made by the two-step polymerization process is recovered from the emulsion, utilizing standard coagulation techniques. For instance, coagulation can be accomplished by the addition of salts, acids or both to the latex.

After the rubbery polymer is recovered by coagulation, it can be washed to further reduce odors. This can be accomplished by simply pouring or spraying water on the rubbery polymer. The rubbery polymer can also be washed by putting it in a water bath to further reduce odor. After being washed, the rubbery polymer is generally dried.

It is often advantageous to convert the dry rubbery polymer into a powder to facilitate its usage. In this case, it will be beneficial to add a partitioning agent to the rubbery polymer. Some representative examples of partitioning agents which can be employed include calcium carbonate, emulsion polyvinyl chloride and silica. Calcium carbonate is a highly desirable partitioning agent which can be utilized in such applications.

The rubbery polymers made by the process of this invention can be blended with polyvinylchloride to make leather-like compositions. These leathery compositions offer an excellent combination of properties for utilization in making skin compounds for panels used in automotive applications.

These leathery compositions can be prepared by blending the rubbery polymer into polyvinylchloride (PVC), utilizing standard mixing techniques. It is highly preferred for the rubbery polymer to be in powdered form when blended into PVC to make such leathery compositions.

Such leathery compositions typically contain from about 40 to 160 parts by weight of the rubbery polymer, from about 10 to about 50 parts of a plasticizer and from about 0.1 to about 5 parts by weight of an antidegradant per 100 parts by weight of the polyvinylchloride. It is typically preferred for such leathery compositions to contain from about 60 to about 120 parts by weight of the rubbery polymer, from about 15 to about 40 parts of the plasticizer and from about 0.5 to 3 parts of an antidegradant (per 100 parts of the PVC). It is typically more preferred for the leathery composition to contain from about 70 to about 90 parts by weight of the rubbery polymer, from about 20 to about 30 parts by weight of the plasticizer and from about 1 to 2 parts by weight of the antidegradant per 100 parts by weight of the PVC.

Such compositions will also generally contain an acrylonitrile-butadiene-styrene resin (ABS resin). The leathery composition will typically contain from about 15 parts to about 80 parts of ABS resin per 100 parts of PVC. The leathery composition will preferably contain from about 25 to about 55 parts per weight of the ABS resin per 100 parts by weight of the PVC. It is generally more preferred for the leathery composition to contain from about 30 to about 40 parts by weight of the ABS resin per 100 parts by weight of PVC. Various colorants and/or pigments will typically also be added to the composition to attain a desired color.

Such leathery compositions are useful in a wide variety of applications. For example, they have been found to be extremely valuable when used in making skins for automotive panels, Such panels are typically comprised of a semi-rigid urethane foam which is supported by a rigid backing and covered with the leathery composition of this invention. Such skins are made by calendering the leathery compositions of this invention and then cutting them to the desired size and shape. Such skins for automotive applications which are made with the leathery compositions of this invention offer outstanding heat and ultraviolet light stability. These are highly desirable characteristics which can help to prevent the skin of automotive panels from cracking during the normal life of the vehicle.

The rubbery polymers made by the technique of this invention can also be blended with other halogen containing polymers (in addition to PVC), styrenic polymers (polymers which contain styrene, such as acrylonitrile-styrene-acrylate (ASA) polymers), polyolefins and polyamides to produce compositions which exhibit good heat and ultraviolet light resistance. Such polymeric compositions can be used in manufacturing a wide variety of useful articles, such as profiles, moldings, sheeting, flooring, wall coverings, hose, cables and footwear. Virtually any type of polyamide (nylon) can be utilized in preparing such blends. These nylons are generally prepared by reacting diamines with dicarboxylic acids. The diamines and dicarboxylic acids which are utilized in preparing such nylons will generally contain from about 2 to about 12 carbon atoms. However, nylons which can be utilized in such blends can also be prepared by addition polymerization. Some representative examples of nylons which can be used include nylon-6,6, nylon-6, nylon-7, nylon-8, nylon-9, nylon-10, nylon-11, nylon-12 and nylon-6,12. These nylons will typically have a number average molecular weight which is within the range of about 8,000 to about 40,000 and will more typically have a number average molecular weight which is within the range of about 10,000 to about 25,000. Some representative examples of polyolefins which can be used include linear low density polyethylene, high density polyethylene, polypropylene, polybutylene and modified polyolefins, such as ethylene vinyl acetate (EVA).

This invention is illustrated by the following examples which are merely for the purpose of illustration and are not to be regarded as limiting the scope of this invention or the manner in which it can be practiced. Unless specifically indicated otherwise, all parts and percentages are given by weight.

Comparative Example 1

In this experiment, a rubbery polymer was made utilizing the general technique described in U.S. Pat. No. 5,415,940. The polymerization was conducted in a reactor having a capacity of 100 liters. The reactor was equipped with an axially flow turbine agitator which was operated at 110 rpm (revolutions per minute).

The reactor was charged with 74.6 kg (kilograms) of water, 0.92 kg of a half ester maleate soap (made with $C_{16}$ fatty alcohol), 0.31 kg of a 50 percent aqueous potassium hydroxide solution, 0.062 kg of sodium dodecylbenzene sulfonate, 18.0 kg of n-butylacrylate, 2.6 kg of acrylonitrile, 5.1 kg of methylacrylate, 0.38 kg of 1,4-butane diol dimethacrylate, 0.078 kg of t-dodecylmercaptan and 0.058 kg of potassium persulfate. When a total solids content of about 25 percent was achieved, 0.025 kg of additional potassium persulfate was added. This first stage of the polymerization was carried out for a period of about 2.5 hours. An initial polymerization temperature of 45° C. was employed with the temperature being increased to 60° C. before the second stage. This first-stage polymerization resulted in the production of a seed polymer latex which was used in the second step of the polymerization.

In the second step of the polymerization, 1.47 kg of acrylonitrile, 3.4 kg of styrene, 0.050 kg of divinylbenzene and 0.009 kg of t-dodecylmercaptan were charged into the reactor containing the seed polymer latex. The temperature was maintained at 60° C. for 2 hours and then increased to 70° C. for an additional hour. The polymerization proceeded until a solids content of about 30 percent was attained. The latex produced was white in color, had a pH of about 6.5, had a Brookfield viscosity of about 6 centipoise (CPS), a surface tension of about 49 dyne per centimeter, a particle size of about 80 nanometers and had a residual acrylonitrile concentration of about 2,000 ppm (parts per million), a residual styrene concentration of about 250 to 350 ppm and a residual n-butylacrylate concentration of about 400 to 600 ppm. The latex made was coagulated and a dry rubber was recovered. After being ground to an average particle size of about 1 mm in diameter, the rubber still had a strong odor and contained less than 5 ppm of residual acrylonitrile, 260 ppm of residual styrene and 487 ppm of residual n-butyl acrylate.

Comparative Example 2

In this experiment, a low fogging rubbery polymer was synthesized using the technique described in Example 14 of U.S. Pat. No. 5,674,933. In the procedure used, the polymerization was conducted in a reactor having a capacity of 100 liters. The reactor was equipped with an axially flow turbine agitator which was operated at 110 rpm (revolutions per minute).

The reactor was charged with 74.6 kg (kilograms) of water, 0.612 kg of an aromatic formaldehyde condensation product soap, 0.31 kg of a 50 percent aqueous potassium hydroxide solution, 0.3 kg of sodium dodecylbenzene sulfonate, 18.0 kg of n-butylacrylate, 2.6 kg of acrylonitrile, 5.1 kg of methylacrylate, 0.38 kg of 1,4-butane diol dimethacrylate, 0.078 kg of t-dodecylmercaptan and 0.058 kg of potassium persulfate. The aromatic formaldehyde condensation product soap utilized in this experiment was the sodium salt of the condensation product of naphthalene sulfonic acid and formaldehyde. It had a molecular weight which was within the range of about 1000 to about 5000 and can be represented by the structural formula:

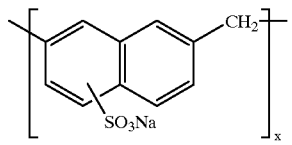

A temperature of about 60° C. was maintained throughout the polymerization. When a total solids content of about 25 percent was achieved, 0.025 kg of additional potassium persulfate was added. This first stage of the polymerization was carried out for a period of about 2½ hours. This first stage polymerization resulted in the production of a seed polymer latex which was used in the second step of the polymerization.

In the second step of the polymerization, 1.47 kg of acrylonitrile, 3.4 kg of styrene, 0.050 kg of divinylbenzene and 0.009 kg of t-dodecylmercaptan were charged into the reactor containing the seed polymer latex. The polymerization proceeded until a solids content of about 30 percent was attained. The latex produced was white in color, had a pH of about 6.5, had a Brookfield viscosity of about 6 centipoise (CPS), a surface tension of about 49 dyne per centimeter, a particle size of about 100 nanometers and had a residual acrylonitrile concentration of about 2,000 ppm (parts per million), a residual styrene concentration of about 250 to 350 ppm, a residual n-butylacrylate concentration of about 600 to 800 ppm. The latex made was coagulated and a dry rubber was recovered.

The rubbery polymer made was tested for fogging characteristics. In the procedure used, the condensate from a 10-gram sample maintained at 100° C. was captured for 16 hours on a cooled aluminum foil which was supported on a glass plate. After the 16-hour period, it was determined gravimetrically that 0.3 mg of condensate had formed. Thus, the fogging characteristics of the rubbery polymer made in this experiment were much better than the fogging characteristics of the rubbery polymer synthesized in Comparative Example 1, where 4.0 mg of condensate were collected in the fogging test. After being ground to an average particle size of about 1 mm in diameter, the rubber still had a strong odor and contained less than 5 ppm of residual acrylonitrile, 200 ppm to 300 ppm of residual styrene and 500 ppm to 700 ppm of residual n-butyl acrylate.

EXAMPLE 3

In this experiment, a deodorized rubbery polymer was synthesized, utilizing the technique of this invention. The general procedure described in Example 1 was used except that a redox initiator system was employed. The first-stage polymerization was initiated by the addition of 0.25 phm (per hundred monomers) of potassium persulfate and 0.06 phm of triethanol amine.

In the second polymerization step, the additional acrylonitrile, styrene and divinylbenzene was charged into the reactor containing the seed polymer latex. Then, an additional 0.2 phm of t-butyl hydroperoxide and 0.1 phm of sodium formaldehyde sulfoxylate was charged into the reactor and the temperature was maintained at 60° C. for 1 more hour. The latex made had a residual acrylonitrile level of 1243 ppm, a residual styrene level of 18 ppm and a residual n-butyl acrylate level of 318 ppm.

EXAMPLE 4

In this experiment, the procedure employed in Example 3 was repeated except that the polymerization temperature was increased at the end of the second phase of the polymerization to 70° C. for an additional hour. Then, an additional 0.2 phm of t-butyl hydroperoxide and 0.1 phm of sodium formaldehyde sulfoxylate was charged into the reactor and the temperature was maintained at 70° C. for 1 more hour. The latex made had a residual acrylonitrile level of 1089 ppm, a residual styrene level of 6 ppm and a residual n-butyl acrylate level of 245 ppm.

EXAMPLE 5

In this experiment, the procedure employed in Example 4 was repeated except that the additional 0.2 phm of t-butyl hydroperoxide and 0.1 phm of sodium formaldehyde sulfoxylate was charged into reactor at room temperature and the room temperature was maintained for 1 day. The latex made had a residual acrylonitrile level of 970 ppm, a residual styrene level of 4 ppm and a residual n-butyl acrylate level of 129 ppm.

EXAMPLE 6

In this experiment, the procedure employed in Example 1 was repeated except that the polymerization temperature was increased to 60° C. before the second phase of the polymerization and 0.2 phm of t-butyl hydroperoxide and 0.1 phm of sodium formaldehyde sulfoxylate was added to the seed latex.

The final latex obtained after the second polymerization step had a residual acrylonitrile level of 1860 ppm, a residual styrene level of 178 ppm and a residual n-butyl acrylate level of 92 ppm.

EXAMPLE 7

In this experiment, a deodorized rubbery polymer was synthesized utilizing the procedure described in Example 1 except that the first-stage polymerization was initiated by the addition of 0.25 phm of potassium persulfate, 0.06 phm of triethanol amine and 0.15 phm of 4,4'-azobis(4-cyanovaleric acid), which is also known as 4,4'-azobis(4-cyanopentanoic acid) or azocarboxy. The polymerization temperature was increased to 60° C. before the second phase of the polymerization and 0.2 phm of t-butyl hydroperoxide and 0.1 phm of sodium formaldehyde sulfoxylate was added to the seed polymer latex.

In the second polymerization step, the additional acrylonitrile, styrene and divinylbenzene was charged into the reactor containing the seed polymer latex. Then, an additional 0.2 phm of t-butyl hydroperoxide and 0.1 phm of sodium formaldehyde sulfoxylate was charged into the reactor and the temperature was maintained at 60° C. for 2 more hours. The latex made had a residual acrylonitrile level of 1153 ppm, a residual styrene level of 36 ppm and a residual n-butyl acrylate level of 96 ppm. The rubbery polymer was then recovered from the latex and ground to a small average particle size about 1 mm in diameter. The powdered rubbery polymer did not have a bad odor.

EXAMPLE 8

In this experiment, the procedure employed in Example 7 was repeated except that the polymerization temperature was increased at the end of the second phase of the polymerization to 70° C. with the polymerization being continued for an additional hour. In other words, the polymerization was carried out for two hours at 60° C. followed by 1 additional hour at 70° C. This extra hour of polymerization time at the higher temperature further reduced the level of residual monomers. The latex made had a residual acrylonitrile level of 705 ppm, a residual styrene level of 4 ppm and a residual n-butyl acrylate level of 39 ppm. The rubbery polymer was then recovered from the latex and ground to a small average particle size of about 1 mm in diameter. The powdered rubbery polymer did not have a bad odor.

EXAMPLE 9

In this experiment, the procedure employed in Example 8 was repeated except that 0.15 phm of 4,4' azobis(4-cyanovaleric acid) was replaced by 0.15 phm of 2,2' azobis(2-amidinopropane)dihydrochloride. The latex made had a residual acrylonitrile level of 1588 ppm, a residual styrene level of 8 ppm and a residual n-butyl acrylate of 48 ppm.

EXAMPLE 10

In this experiment, the procedure employed in Example 7 was repeated except that the t-butyl hydroperoxide was replaced by the cumene hydroperoxide. The latex made had a residual acrylonitrile level of 2028 ppm, a residual styrene level of 132 ppm and a residual n-butyl acrylate level of 265 ppm.

EXAMPLE 11

In this experiment, a rubbery polymer was synthesized utilizing the procedure described in Example 7 except that 0.2 phm of t-butyl hydroperoxide and 0.1 phm of sodium formaldehyde sulfoxylate were replaced by 0.2 phm of sodium metabisulfite. The latex obtained after the second polymerization step had a residual acrylonitrile level of 1895 ppm, a residual styrene level of 198 ppm and a residual n-butyl acrylate level of 206 ppm.

What is claimed is:

1. A process for preparing a deodorized rubbery polymer which comprises the steps of (1) polymerizing in a first stage (a) butyl acrylate, (b) at least one member selected from the group consisting of methyl methacrylate, ethyl methacrylate, methyl acrylate and ethyl acrylate, (c) acrylonitrile and (d) a crosslinking agent under emulsion polymerization conditions to produce a seed polymer containing latex, wherein said polymerization is initiated with a redox initiator system, wherein the redox initiator system is comprised of a free radical generator and a reducing agent selected from the group consisting of sodium bisulfite, sodium metabisulfite, sodium dithionate, sodium formaldehyde sulfoxylate, ascorbic acid and triethanol amine; (2) adding (a) styrene, (b) additional acrylonitrile, (c) additional crosslinking agent and (d) additional free radical generator to the seed polymer containing latex under emulsion polymerization conditions which result in the formation of an emulsion containing the rubbery polymer; and (3) recovering the rubbery polymer from the emulsion containing the rubbery polymer.

2. A process as specified in claim 1 wherein the reducing agent is sodium metabisulfite.

3. A process as specified in claim 1 wherein the reducing agent is triethanol amine.

4. A process as specified in claim 1 wherein the reducing agent is sodium formaldehyde sulfoxylate.

5. A process as specified in claim 1 wherein the free radical generator is a peroxygen compound or an azo compound or the mixing of them.

6. A process as specified in claim 5 wherein the peroxygen compound or the azo compounds are preferably at least partially water-soluble compounds.

7. A process as specified in claim 6 wherein the peroxygen compounds are selected from the group consisting of potassium persulfate, ammonium persulfate, hydrogen peroxide, diisopropylbenzene hydroperoxie, cumene hydroperoxide, t-butyl hydroperoxide and p-menthane hydroperoxide.

8. A process as specified in claim 6 wherein the azo compounds are selected from the group consisting of 4,4'-azobis(4-cyanovaleric acid), 2,2'-azobis(2-amidinopropane) dihydrochloride.

9. A process as specified in claim 1 wherein the polymerization temperature is within the range of about 10° C. to about 80° C.

10. A process as specified in claim 9 wherein the polymerization temperature is preferably within the range of about 20° C. to about 70° C.

* * * * *